Patented Nov. 15, 1927.

1,649,254

UNITED STATES PATENT OFFICE.

RURIC C. ROARK, OF WASHINGTON, DISTRICT OF COLUMBIA.

FUMIGANT.

No Drawing.  Application filed August 4, 1924. Serial No. 730,081.

This invention relates to improvements in materials for fumigating injurious insects in grain and other places.

An object of the invention is to provide a non-inflammable material suitable for fumigating weevils in grain.

Another object is to provide a material for fumigating weevils in grain which will not injuriously affect the milling properties of the grain, the baking qualities of the flour made therefrom, or the value as feedstuffs of the grain or of the bran and other by-products resulting in the manufacture of the flour.

At the present time carbon disulfide is extensively employed for destroying weevils and other injurious insects infesting wheat and other grains, but certain very serious disadvantages attend the use of this material. Its odor is offensive and the vapor in moderate concentration is quite toxic to man. While quite volatile, complaints occasionally come from millers that wheat which has been treated with carbon disulfide still carries its odor, and it has been proven that the baking quality of flour from carbon disulfide fumigated wheat is sometimes injuriously affected.

The most serious objection to the use of carbon disulfide as a fumigant, however, arises from the fact that it is readily inflammable and that its vapor when mixed with air is highly explosive. For this reason fire insurance companies refuse to carry the fire risk on elevators during such time as carbon disulfide is being used to treat the grain contained therein. Recently the General Managers Association of Chicago, representing the leading railway systems in the United States adopted a resolution prohibiting the use of carbon disulfide for fumigating cars of grain. There is therefore great need of a substitute for carbon disulfide for fumigating purposes.

A great variety of substances other than carbon disulfide have been proposed and tried in the fumigation of grain weevils, but have never come into commercial use. Some of these substances are: carbon tetrachloride, hydrocyanic acid gas, sulfur dioxide, carbon dioxide, chloropicrin, naphthalene, phosgene, arsine, and cyanogen chloride. Numerous investigators have concluded that carbon tetrachloride is ineffective; hydrocyanic acid gas fails to kill weevils at any great depth below the surface of the grain; sulfur dioxide has low toxicity, is very injurious to ironwork, destroys the germination power of wheat, makes a sticky dough and hinders fermentation, the bread obtained being heavy and not fit for consumption; carbon dioxide is effective only in tightly sealed containers and at relatively high concentrations over a considerable period of time; the use of chloropicrin requires a gas mask and its low vapor pressure at ordinary temperatures necessitates a special treatment of the fumigated flour before it is suitable for baking; moreover, chloropicrin is not commercially available, naphthalene is not very effective and its odor is persistent and highly objectionable; phosgene is very poisonous to man and comparatively non-poisonous to insects and its high vapor pressure makes it difficult to control; the toxicity of arsine to insects is comparatively low; and the shortcomings of cyanogen chloride as a fumigant are essentially the same as those of hydrocyanic acid gas.

It is evident, therefore, that there is great need for a fumigant which is effective in ridding wheat and other cereals of injurious insects, which is not dangerously toxic nor highly disagreeable to those handling the material, and which can be used without danger of fire or explosion.

I have discovered that a mixture of ethyl acetate and carbon tetrachloride in the proportion of approximately 2 volumes of the former to 3 volumes of the latter is non-inflammable, kills weevils in wheat in box cars when poured over the wheat at the rate of 37.5 pounds per 1,000 cubic feet of enclosed space, has an agreeable odor and is pleasant to handle, and volatilizes from the wheat without leaving a residual odor so that the flour, the bran and other by-products made from the fumigated wheat are entirely free from foreign odor.

Ethyl acetate is a colorless, pleasant smelling liquid, density 0.900, boiling point 77.15 C., insoluble in water but soluble in alcohol, ether, and other organic solvents. Carbon tetrachloride is a colorless, sweet smelling liquid, density 1.584, boiling point 76.75 C., insoluble in water but soluble in alcohol, ether and other organic solvents.

The processes of applying this mixture are exactly the same as those used with carbon disulfide. The mixture may be poured, sprinkled, or sprayed over the surface of the grain it is desired to fumigate; the mixture may be placed in shallow pans and allowed to evaporate; the mixture, either in the form of a liquid or a vapor, may be pumped into the grain at any desired depth through a pipe provided with orifices along its length or at its extremity.

I have found that ethyl acetate alone is effective in killing grain weevils and other injurious insects, but in the presence of grain the addition of carbon tetrachloride increases its insecticidal action. This it does probably by aiding in the dissemination of the ethyl acetate vapor throughout the mass of tightly packed grain. The vapor of carbon tetrachloride has a greater density than that of ethyl acetate, and hence tends to expedite its passage from the top of the grain to the bottom. As in the case of carbon disulfide, the ethyl acetate, or the ethyl acetate-carbon tetrachloride mixture should always be applied at the top of the container to be fumigated.

Moreover, the addition of 3 volumes of carbon tetrachloride to 2 volumes of ethyl acetate renders the mixture non-inflammable, and the fact that the vapor pressure of carbon tetrachloride is slightly greater than that of ethyl acetate for all temperatures from −20 C. to 80 C. renders the vapors of this mixture non-inflammable.

In order that the milling and baking qualities of wheat may not be injuriously affected by the application of this fumigating mixture, I have found that ethyl acetate and carbon tetrachloride of a certain grade or standard must be used. Ethyl acetate is usually sold under the name of acetic ether. The ordinary commercial grade of acetic ether contains about 85% ethyl acetate, the remainder being largely ethyl alcohol with small amounts of higher esters and miscellaneous impurities. I have found that the fumigating efficiency of ethyl alcohol is very much less than that of ethyl acetate, so that an acetic ether containing 85% ethyl acetate is not as effective for fumigating purposes as one containing a higher proportion of ester, such as the grade of acetic ether known as the "99%" grade. But more important than the ester content of the acetic ether is its freedom from odoriferous constituents of low volatility which tend to remain on the grain and pass on into the flour and even the bread. These odoriferous constituents of low volatility are apparently esters of fatty acids higher in the series than acetic acid, and originate from the acetate of lime used in the preparation of acetic acid, which when combined with ethyl alcohol forms ethyl acetate. I have found that neither the ordinary commercial (85%) nor the "99%" grade of acetic ether is suitable for grain fumigation, due to the presence of these odoriferous constituents of low vapor pressure, but by suitable rectification a pure acetic ether can be obtained which gives eminently satisfactory results. A purified acetic ether is now on the market and can be obtained in large quantities at a reasonable price.

The following test serves to determine the suitability of a sample of acetic ether for grain fumigation: Wet a sheet of bibulous paper, such as a sheet of filter paper commonly employed in chemical laboratories, with the acetic ether, and allow to evaporate at room temperature. Note the odor from time to time. A grade of acetic ether suitable for fumigating grain should be free from any foreign odor, and should volatilize completely, leaving no residual odor.

The carbon tetrachloride used for mixing with the ethyl acetate to increase its insecticidal power and to produce a non-inflammable mixture, should likewise volatilize when given the above test without leaving a residual odor. The presence of carbon disulfide and other sulfur compounds in the carbon tetrachloride is particularly objectionable, as they impart a garlicky odor to the fumigated grain.

The dosage of acetic ether or acetic ether-carbon tetrachloride mixture for fumigating purposes is based on the content of ethyl acetate. I have found that about 12.5 to 15 pounds ethyl acetate (mixed with twice this amount of carbon tetrachloride) per 1,000 cubic feet of enclosed space will kill all weevils in wheat in box cars when the liquid is poured over the top of the grain, the temperature being about 70° F. The dosage must be varied somewhat depending on the temperature, humidity, and more especially the tightness of the container. The above dosage is based on a 24 hour exposure; to secure a kill in a shorter time a greater quantity of fumigant is required. On the other hand, at higher temperatures, and in boxes or bins which are more tightly constructed than box cars, a smaller dosage will suffice.

Having thus described my invention I claim:

1. As a new composition of matter, a mixture of ethyl acetate and carbon tetrachloride in such proportion as to be non-inflammable at ordinary temperatures.

2. An insecticide involving two organic liquids having substantially the same vapor pressure at ordinary temperatures, one of said liquids being an ester and the other being non-inflammable, and the vapor given off from said liquids at ordinary temperatures being heavier than air.

3. As a new composition of matter, a mixture of ethyl acetate and carbon tetrachloride in the approximate proportion of 2 volumes of the former to 3 volumes of the latter.

4. An insecticide involving a plurality of organic liquids substantially non-toxic to man and having substantially equal vapor pressures at ordinary temperatures.

5. An insecticide embodying ethyl acetate as its essential ingredient.

6. An insecticidal fumigant containing an ester and carbon tetrachloride in such proportion as to be non-inflammable at fumigating temperature.

7. An insecticide embodying a plurality of organic liquids giving off at ordinary temperatures vapor heavier than air, at least one of said liquids being an ester substantially non-toxic to man and at least one of said liquids being non-inflammable.

RURIC C. ROARK.